(12) United States Patent
Stille

(10) Patent No.: US 9,506,765 B2
(45) Date of Patent: Nov. 29, 2016

(54) METHOD AND SYSTEM FOR CALCULATING AN ENERGY EFFICIENT ROUTE

(71) Applicant: Navteq B.V., Veldhoven (NL)

(72) Inventor: Johannes Stille, Frankfurt am Main (DE)

(73) Assignee: HERE Global B.V., Eindhoven (NL)

( * ) Notice: Subject to any disclaimer, the term of this patent is extended or adjusted under 35 U.S.C. 154(b) by 136 days.

(21) Appl. No.: 14/020,234

(22) Filed: Sep. 6, 2013

(65) Prior Publication Data

US 2014/0005943 A1  Jan. 2, 2014

Related U.S. Application Data

(63) Continuation of application No. 13/004,149, filed on Jan. 11, 2011, now Pat. No. 8,543,328.

(51) Int. Cl.
*G01C 21/00* (2006.01)
*G01C 21/34* (2006.01)

(52) U.S. Cl.
CPC .................... *G01C 21/3469* (2013.01)

(58) Field of Classification Search
CPC .............. G01C 21/3469; G01C 21/32; G01C 21/3697; G01C 21/26
See application file for complete search history.

(56) References Cited

U.S. PATENT DOCUMENTS

| 3,797,434 | A | * | 3/1974 | Matthews ................... 114/280 |
| 5,742,922 | A |   | 4/1998 | Kim |
| 5,778,326 | A | * | 7/1998 | Moroto et al. ................ 701/22 |
| 5,913,917 | A | * | 6/1999 | Murphy ....................... 701/123 |
| 6,005,494 | A |   | 12/1999 | Schramm |
| 7,705,772 | B1 | * | 4/2010 | Shelton ................... G01S 7/354 342/104 |
| 2004/0039498 | A1 | * | 2/2004 | Ollis et al. ................... 701/23 |
| 2004/0068352 | A1 | * | 4/2004 | Anderson .................... 701/25 |
| 2008/0082223 | A1 | * | 4/2008 | Daum et al. ................. 701/19 |
| 2009/0299555 | A1 | * | 12/2009 | Houpt et al. ................. 701/19 |
| 2009/0299617 | A1 | * | 12/2009 | Denaro ....................... 701/117 |
| 2010/0063676 | A1 | * | 3/2010 | Ito ..................... B60R 21/0134 701/36 |
| 2011/0077854 | A1 | * | 3/2011 | Fushiki et al. ............... 701/201 |
| 2011/0087391 | A1 | * | 4/2011 | Pandit et al. ................ 701/22 |
| 2011/0106388 | A1 | * | 5/2011 | Boeckenhoff et al. ......... 701/70 |
| 2012/0179362 | A1 | * | 7/2012 | Stille .......................... 701/410 |

FOREIGN PATENT DOCUMENTS

EP          2136182      12/2009

* cited by examiner

*Primary Examiner* — Redhwan K Mawari
(74) *Attorney, Agent, or Firm* — Lempia Summerfield Katz LLC

(57) ABSTRACT

A method and system for calculating an energy efficient route is disclosed. A route calculation application calculates one or more routes from an origin to a destination. For each of the routes, the route calculation application uses segment cost data associated with each segment in the route. The segment cost is calculated by adjusting an energy consumption value by subtracting a bias term for each segment with known slope data. The bias term causes segment costs associated with segments having a slope that can be traveled with typical efficiency, a zero slope, and an unknown slope to be substantially the same. The bias term also causes the segment cost associated with a segment with a slope that can be traveled efficiently to be less than the segment cost associated with a segment with unknown slope, and the segment cost associated with a segment with a slope that causes inefficient travel to be greater than the segment cost associated with a segment with unknown slope.

18 Claims, 5 Drawing Sheets

METHOD AND SYSTEM FOR CALCULATING AN ENERGY EFFICIENT ROUTE

REFERENCE TO RELATED APPLICATIONS

This application is a continuation under 37 C.F.R. §1.53 (b) and 35 U.S.C. §120 of U.S. patent application Ser. No. 13/004,149 filed Jan. 11, 2011, which is hereby incorporated by reference in its entirety.

FIELD

The present invention relates generally to energy efficient routing, and more particularly, relates to cost values used by a routing algorithm to calculate an energy efficient route.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route.

The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. Roads in the geographic region may be represented in the geographic database with one or more road segments. Each road segment is associated with two nodes; one node represents the point at one end of the road segment and the other node represents the point at the other end of the road segment. Alternatively, roads may be represented with curves, such as spline, Bezier, and clothoid curves.

The geographic database also includes information about the represented roads, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. For example, some navigation systems calculate routes to minimize the vehicle's fuel or energy consumption. Such a route is sometimes referred to as a "green route." There are many factors that determine a vehicle's fuel or energy consumption as the vehicle travels along a particular route. These factors include speed of travel, traffic light and sign locations, weather, and road surface type, slope, and curvature.

To calculate an energy efficient route, the navigation system uses a route calculation algorithm, such as the Dijkstra or the A* search algorithm. These search algorithms use a segment cost to calculate a route. For energy efficient routing, the segment cost is based on the road properties of the represented road and how these road properties impact fuel or energy consumption. The route calculation algorithm evaluates road segments from an origin to a destination and identifies the route with the least total cost.

SUMMARY

A computer-implemented method for calculating a segment cost to use with a least-cost routing algorithm for energy efficient routing is described. The method includes obtaining an energy consumption value for a road segment and determining whether slope data is available for the road segment. If slope data is available for the road segment, the method also includes adjusting the energy consumption value by subtracting a bias amount. The bias amount is equal to the road segment's altitude difference (a positive value for uphill and a negative value for downhill) multiplied by an energy factor. The method also includes using the adjusted energy consumption value as a segment cost during route calculation. If slope data is not available for the road segment, the method further includes using the energy consumption value as the segment cost during route calculation.

Obtaining an energy consumption value may include using a lookup table of energy consumption values. The data in the lookup table may be calculated using physical modeling of the road segment. Additionally or alternatively, the data in the lookup table may be collected as vehicles travel on the road segment.

The energy factor may be the derivative of energy consumption with respect to the altitude difference at a typical speed and zero slope. Alternatively, the energy factor may be equal to $e = m^* g^* \eta_{typical}$, where m is vehicle mass, g is the Earth's gravity, and $\eta_{typical}$ is typical engine efficiency. Other values for the energy factor may be used.

As a result, if the road segment's slope is equal to zero (i.e., a level road segment), the segment cost is equal to a segment cost of another road segment with no associated slope data. If the road segment has a slope that can be traveled with typical efficiency, the segment cost is equal to a segment cost of another road segment with no associated slope data. If the road segment has a slope that can be traveled efficiently, the segment cost is less than a segment cost of another road segment with no associated slope data. If the road segment has a slope that causes inefficient travel, the segment cost is greater than a segment cost of another road segment with no associated slope data.

A computer-implemented method for calculating an energy efficient route is also described. The method includes obtaining an origin and a destination associated with a road network. The method also includes calculating an energy efficient route from the origin to the destination using a least-cost routing algorithm and a segment cost associated with energy consumed when driving on a road segment. The segment cost accounts for how a road segment's slope impacts travel efficiency on the road segment when slope data is available for the road segment.

A navigation system that calculates an energy efficient route is also described. The navigation system includes a user interface that allows a user to request route information from a first location to a second location. The navigation system also includes a map database that includes geographic data for a geographic area that includes the first and second locations. The geographic database includes slope data for some road segments that represent roads in the geographic area. The navigation system also includes a processor that executes a route calculation application that calculates a route that minimizes energy consumption when traveling from the first location to the second location. The route is calculated using segment costs. The segment costs for road segments having associated slope data are calculated by subtracting a bias amount from an energy consumption value. The bias amount is equal to the road segment's altitude difference multiplied by an energy factor.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Navigation System

Figure 1:
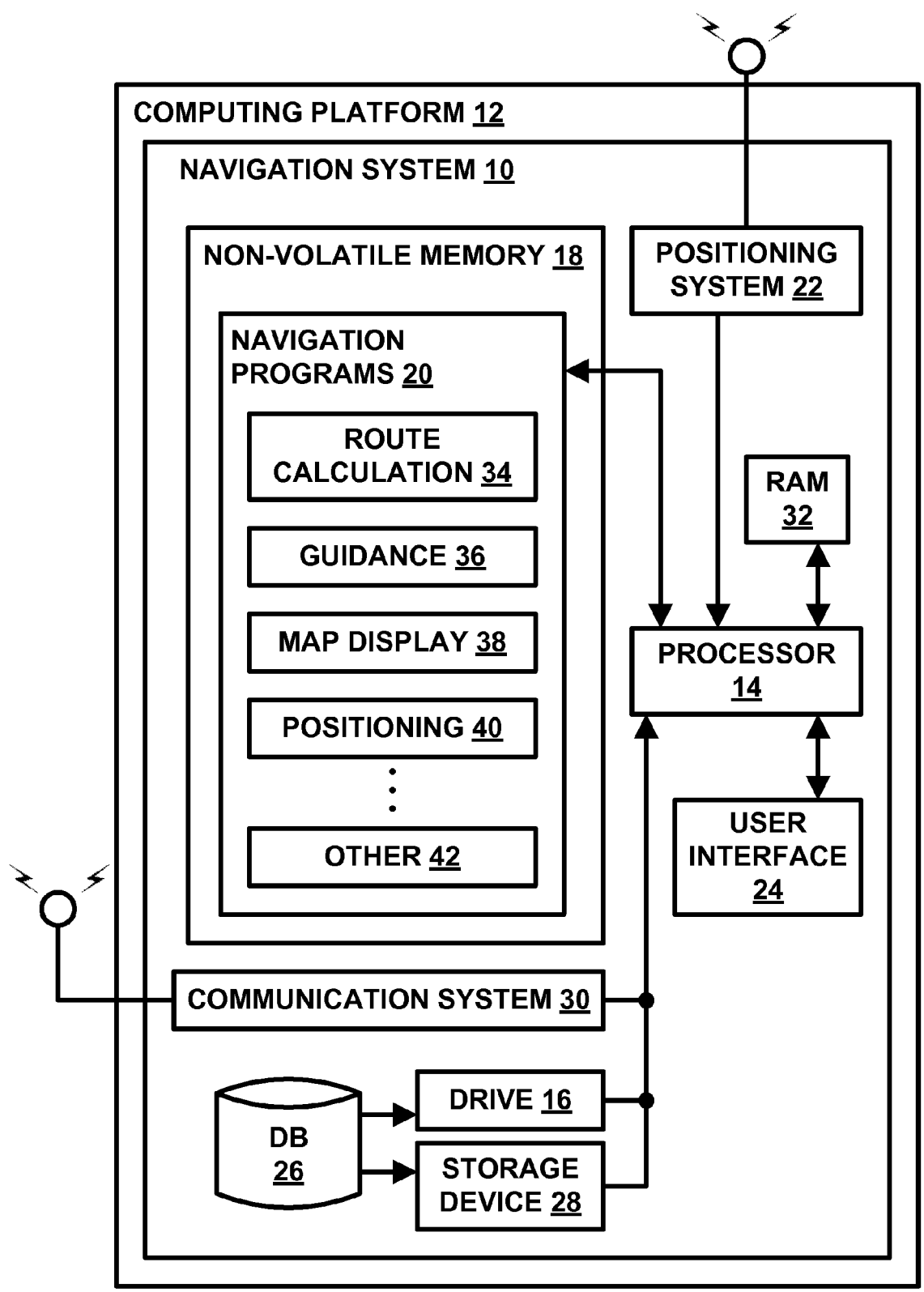
FIG. 1 is a block diagram of a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion or the entire geographic database 26 is stored. In one embodiment, the geographic database 26 may be a geographic database published by NAVTEQ North America, LLC of Chicago, Ill.

The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 32 associated with the processor 14. The navigation system 10 uses the geographic database 26 stored on the storage medium and/or storage device 28, possibly in conjunction with the outputs from the positioning system 22 and the communications system 30, to provide various navigation features and functions.

The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching). Other functions and programming 42 may be included in the navigation system 10. While the description later describes some examples using the A* or the Dijkstra routing algorithms, the route calculation application 34 may be any type of application capable of route calculation.

The processor 14 also receives input from the user interface 24. For example, a user of the navigation system 10 may enter an origin and a destination via the user interface 24. Alternatively, the navigation system may use its current position from the positioning system 22 as the origin. In this example, the positioning application 40 performs map matching to determine what road segment represents the navigation system's position on the road network.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
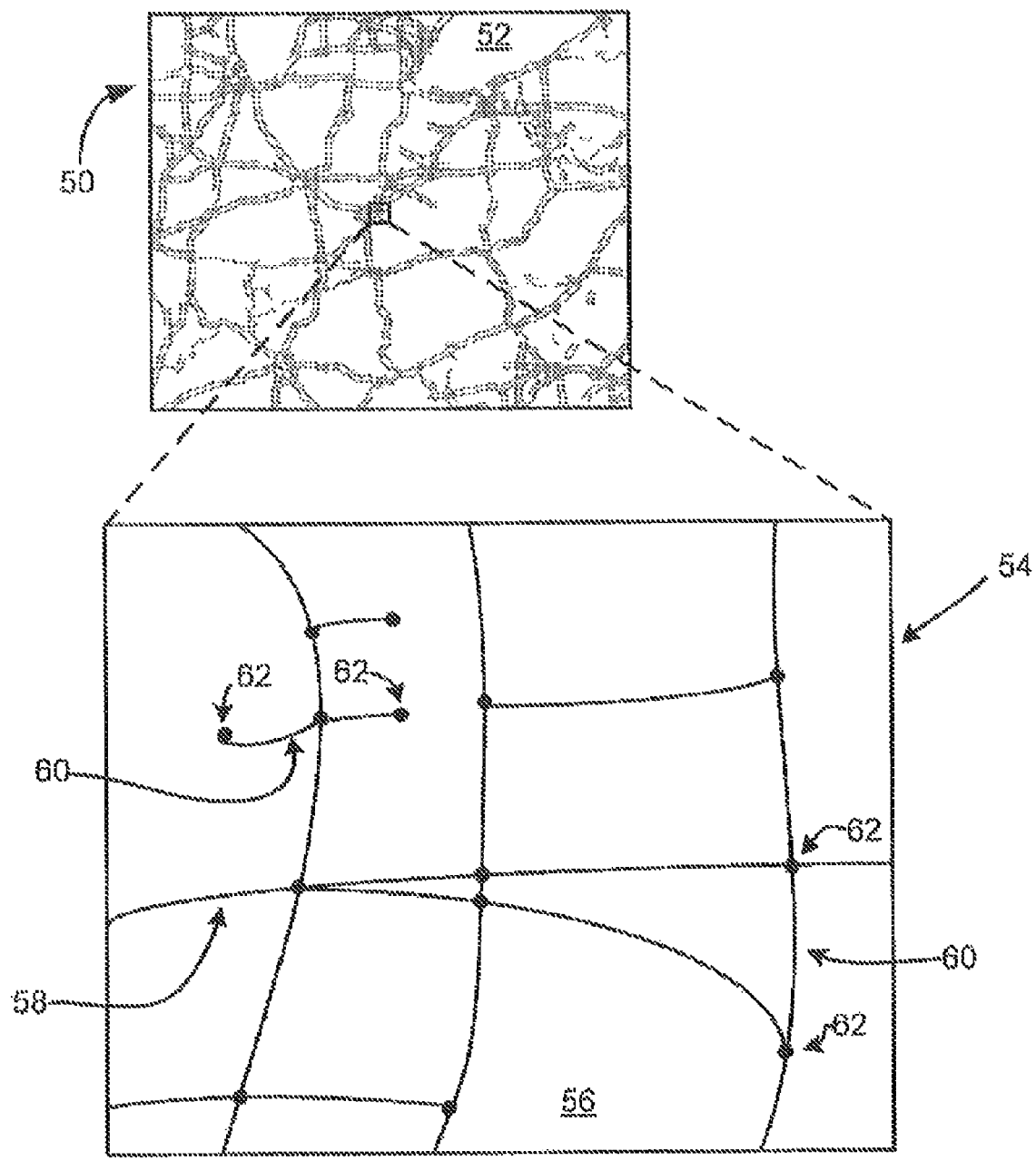
FIG. 2 shows a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
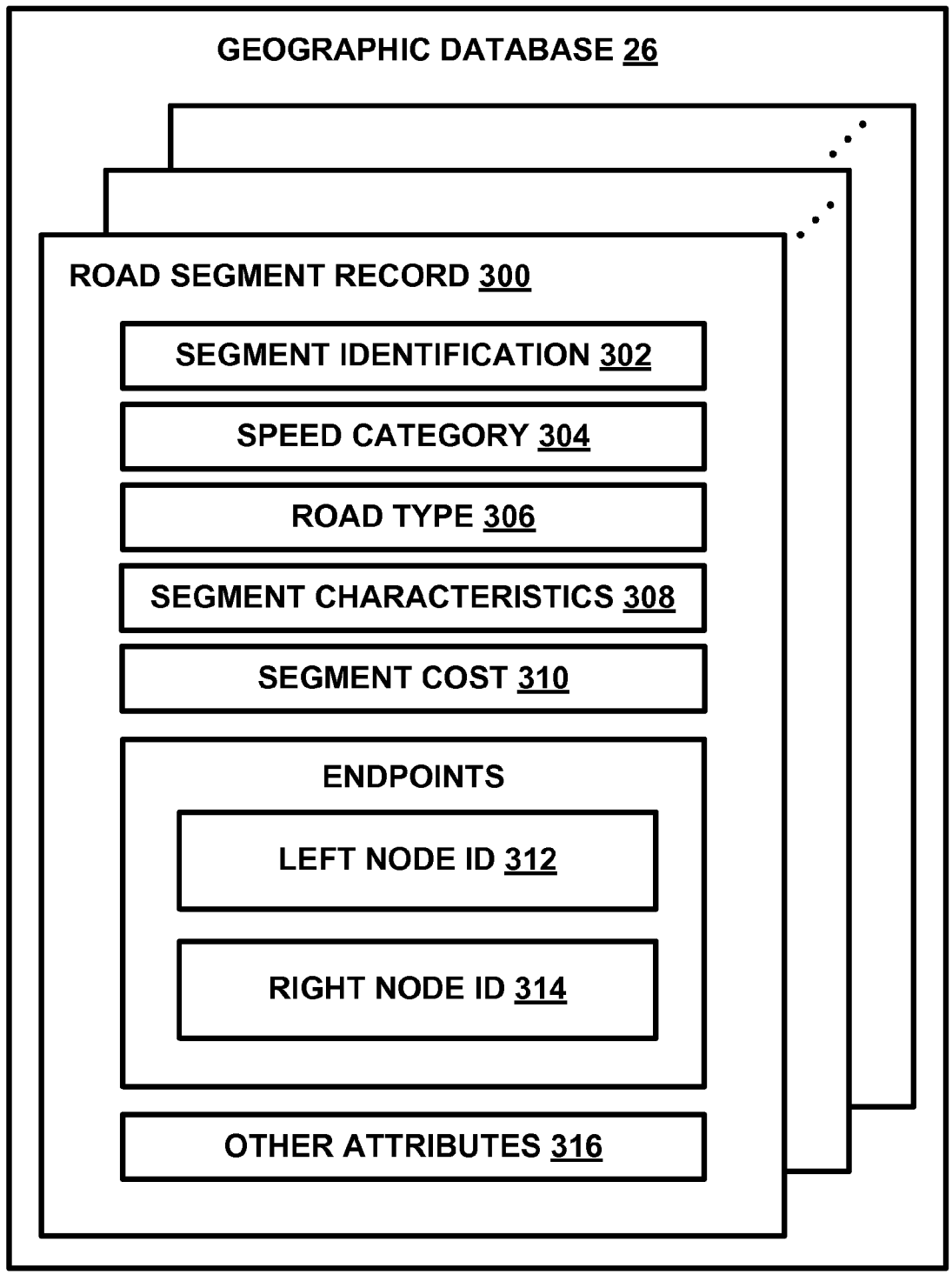
FIG. 3 is a block diagram of a geographic database that includes data that represents the geographic region of FIG. 2, according to an example.

FIG. 3 is a block diagram depicting of some of the data attributes for road segment data records 300 that may be found in the geographic database 26. The data attributes depicted in FIG. 3 include segment identification 302, speed category 304, road type 306, segment characteristics 308, and segment cost 310. The segment data attributes also include references to node data records in the form of node identification 312, 314 corresponding to endpoints of the segment. As this is not an exhaustive list of all the data attributes for the road segment data records, FIG. 3 also depicts other attributes 316.

The road segment data record 300 includes a segment ID 302 by which the data record can be identified in the geographic database 26. The segment ID 302 may be a numeric code, an alpha-numeric code, or any other string of numbers, letters, and/or symbols that can be used to identify the record.

The speed category attribute 304 represents the general speed trend of a road based on posted or implied speed limit. The speed category attribute 304 may contain data associated with the speed limit. Additionally or alternatively, the speed category attribute 304 may contain data associated with a speed range. For example, the speed category attribute 304 may include a data representation of the integer 1 for speeds exceeding 80 mph, the integer 2 for speeds in the range of 65-80 mph, the integer 3 for speeds in the range of 55-64 mph, and so on until the speed range includes 0 mph.

The road type attribute 306 represents the type of road the segment represents. For example, the road type attribute 306 may contain data associated with an interstate highway, a controlled access highway, a city street, a pedestrian walkway, and so on. For example, the road type attribute 306 may contain functional class data, which defines the road type.

The segment characteristic attribute 308 contains data that represent various characteristics of the segment. For example, the segment characteristic attribute 308 may identify whether a segment is a ramp, a bridge, a tunnel, a roundabout, and so on. The segment characteristic attribute 308 may also include data representing road surface type (e.g., concrete, asphalt, gravel) of the represented road segment. The segment characteristic attribute 308 may also include slope and/or curvature data for the segment.

The segment cost attribute 310 includes a value or code representing a cost for traveling on the segment. For purposes of this description, the cost is related to a vehicle's expected fuel and/or energy consumption when traveling on the segment. It is understood that the segment cost attribute 310 may include data for other costs, such as costs used for calculating the shortest or fastest route. It is also understood that the segment cost may be calculated during route calculation and not necessarily stored in the geographic database 26. The segment cost is further described with reference to FIGS. 4-5.

III. Accommodating Slope in Energy Efficient Routing Calculations

Generally, route calculation involves determining an optimum route from a start location to a destination location. A route may be considered the "optimum" route based on different route qualities, such as shortest, fastest, and most energy efficient. To determine the optimum route, the route calculation algorithm minimizes route cost, where "cost" in this context is a generic expression for the quantity (e.g., time, distance, or energy) to be minimized. The route cost also may be based on a combination of such quantities. The cost is typically calculated for each road segment along the route and the cost of a route is the sum of the costs for all its road segments.

For energy efficient routing, the route calculation algorithm determines a route that minimizes energy and/or fuel consumption. An electric vehicle consumes energy, not fuel. For a fossil-fueled vehicle, energy consumption is approximately the same as fuel consumption. For a fossil-fueled vehicle, $CO_2$ production is proportional to fuel consumption. This holds true for electric vehicles that are partially powered by fossil fuels. For purposes of the remaining description, the term energy consumption is used, but it is understood that the term fuel consumption is also appropriate for some vehicles.

The amount of energy consumed by a vehicle while traveling on a road is impacted by the slope of that road. However, when road segment cost for energy efficient routing is calculated based on slope, several problems may occur during route calculation. For example, it is possible to travel downhill without consuming energy. As a result, there is no minimum energy consumption per distance, which violates one of the basic assumptions of the A* routing algorithm. In this scenario, the A* routing algorithm degrades into the Dijkstra routing algorithm, which is less efficient. Alternatively, if one uses the A* routing algorithm with an assumed minimum energy consumption value, the calculated route may not be the optimum energy efficient route as the algorithm may overlook a route containing road segments with lower energy consumption per distance than the assumed minimum energy consumption value.

As another example, electric vehicles with regenerative braking may experience negative energy consumption. However, a negative cost violates one of the basic assumptions of the Dijkstra routing algorithm. In this situation one could use a different algorithm, which greatly increases the computational complexity of the least-cost routing calculation. Alternatively, one could continue to use the Dijkstra routing algorithm by ignoring the negative energy consumption, which means the calculated optimum route may not be the most energy efficient route.

Further problems occur when slope values are not known for all road segments. Typically, when a slope is unknown for a road segment, the routing algorithm assumes zero slope for the energy consumption estimation. As a result, when going uphill, the cost of a road with known slopes seems higher than the cost of a road with unknown slopes. Since more data is usually available for major roads, the route calculation algorithm may calculate a route that leaves a major road at the foot of a hill and goes up the hill on minor roads. When going downhill, the cost of a road with known slopes seems less than the cost of a road with unknown slopes. As a result, the route calculation algorithm may include detours to use a road with a known slope going downhill.

While many problems may occur when using slope data to calculate an energy efficient route, slopes have an important influence on energy consumption. What is needed is a better way to use the available slope data. Thus, what is proposed is to modify how the segment cost is calculated. The segment cost is calculated by subtracting a bias term from per-segment energy consumption for segments with known slope data. If the end of a segment has a higher elevation than the start of the segment, a positive bias term is subtracted from the segment energy consumption. If the end of the segment has a lower elevation than the start of the segment, a negative bias term is subtracted from the segment energy consumption, resulting in an increased segment cost.

IV. Calculating Segment Cost for Energy Efficient Routing $E_{segment}$ is the energy needed to travel on a road segment. $E_{segment}$ can be split into the amount of energy that the vehicle expends on an equal length segment without any slope $E_{level}$ and the amount of energy expended due to an altitude difference $E_{altitude}$, which can be positive or negative.

$$E_{segment} = E_{level} + E_{altitude} \quad \text{(Equation 1)}$$

$E_{level}$ and $E_{segment}$ may be determined by various means, such as using lookup tables or physical modeling. Thus, $E_{altitude}$ may be determined as the difference $E_{segment} - E_{level}$.

The altitude part of the road segment energy can be divided into a typical and a specific part.

$$E_{altitude} = E_{typical} + E_{specific} \quad \text{(Equation 2)}$$

The typical part depends on the altitude difference h (i.e., $h_2 - h_1$, where $h_1$ is the start altitude and $h_2$ is the end altitude) and a typical altitude energy factor e as shown in Equation 3.

$$E_{typical} = e * h \quad \text{(Equation 3)}$$

The selection of a value for the typical altitude energy factor e is a matter of choice within limits. The limits include that the typical altitude energy factor e is fixed and positive. Additional limits on the choice of e as well as some guidelines for choosing a value for e are further provided in Section V. The altitude difference and $E_{typical}$ are positive when going uphill and negative when going downhill.

Figure 4A:
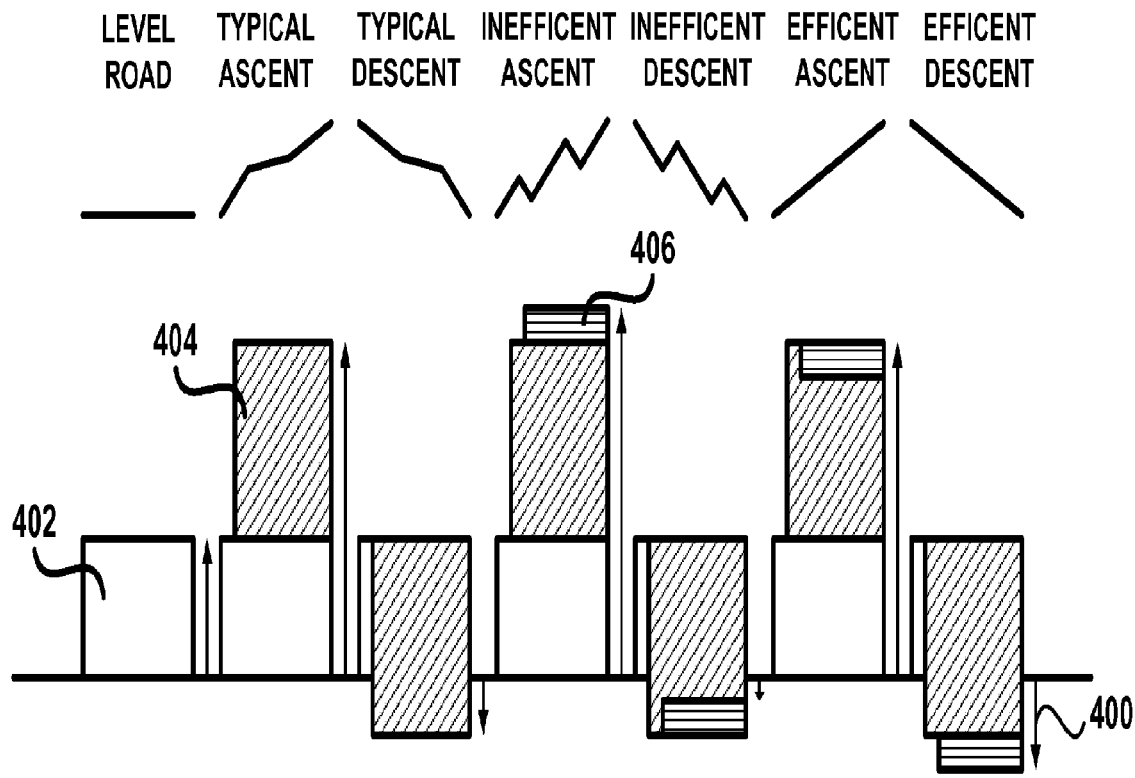
FIG. 4A depicts energy consumption when a vehicle travels on roads having various slope efficiencies, according to an example.

The specific part $E_{specific}$ describes that traveling on some sloped road segments is relatively energy efficient or inefficient as depicted at the top of FIG. 4. In FIG. 4A, energy consumption or gain 400 (depicted as an arrow) is shown for a level road, a typical ascent or decent, an inefficient ascent or decent, and an efficient ascent or descent. For each of these scenarios, FIG. 4A depicts $E_{level}$ 402, $E_{typical}$ 404, and $E_{specific}$ 406.

As seen in FIG. 4A, the specific part may be positive or negative both for uphill or downhill roads. A positive $E_{specific}$ means that on this road segment the vehicle expends more energy (or saves less energy) than usual for the altitude difference. A negative $E_{specific}$ means that on this road segment the vehicle expends less energy (or saves more energy) than usual for the altitude difference.

Figure 4B:
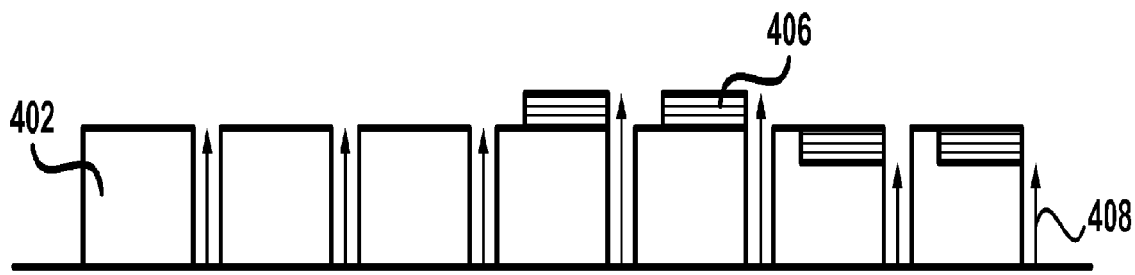
FIG. 4B depicts segment cost when a vehicle travels on roads having various slope efficiencies, according to an example.

FIG. 4B depicts segment costs 408 as an arrow. For using the segment cost in a least-cost routing algorithm, $E_{typical}$ can be dropped from consideration because the sum of $E_{typical}$ for all road segments along a route is equal to $e*h_{total}$ for any route from the given start to the given destination. So by dropping $E_{typical}$, the total cost for every route is changed by the same amount. As a result, the differences between costs for two routes remain unchanged and the choice of a least-cost route is unchanged.

From FIG. 4B, segment cost can be defined as:

$$C_{segment} = E_{level} + E_{specific} \quad \text{(Equation 4)}$$

Rearranging Equation 2 results in $E_{specific} = E_{altitude} - E_{typical}$. Inserting the value of $E_{typical}$ from Equation 3 into this rearranged equation results in:

$$E_{specific} = E_{altitude} - e*h \quad \text{(Equation 5)}$$

Inserting Equation 5 into Equation 4, results in:

$$C_{segment} = E_{level} + E_{altitude} - e*h \quad \text{(Equation 6)}$$

Equation 6 can be further reduced by inserting Equation 1 into Equation 6, resulting in Equation 7, which describes how to calculate the segment cost.

$$C_{segment} = E_{segment} - e*h \quad \text{(Equation 7)}$$

$E_{segment}$ can be determined by various means from information stored in a geographic database, which may include using lookup tables or physical modeling. Together with the choice of e, Equation 7 defines a segment cost that can be used with a least-cost routing algorithm to compute an energy efficient route.

As seen in FIG. 4B, the cost for a road segment negotiating a slope with typical efficiency is the same as for a level road segment. For an uphill road, formerly the cost with a known slope was higher than the cost with an unknown slope, so roads with unknown slope were preferred for going uphill. For a downhill road, formerly the cost with a known slope was higher than the cost with an unknown slope, so roads with unknown slope were avoided for going downhill. Now, using the formula of Equation 7, the cost for going up or down with a typical efficiency is equal to the cost at zero or an unknown slope. There is no general preference anymore between a road going uphill/downhill with a typical efficiency and a road with unknown slope.

When slope is not known for all road segments, using the formula of Equation 7 for road segments with known slope means that using zero slope for cost calculation when the actual slope is unknown is equivalent to just assuming the typical efficiency for the energy needed to negotiate the slope. Thus, a road going uphill/downhill in an efficient way is preferred over a road with unknown slope, and a road with unknown slope is preferred over a road going uphill/downhill in an inefficient way.

Figure 5:
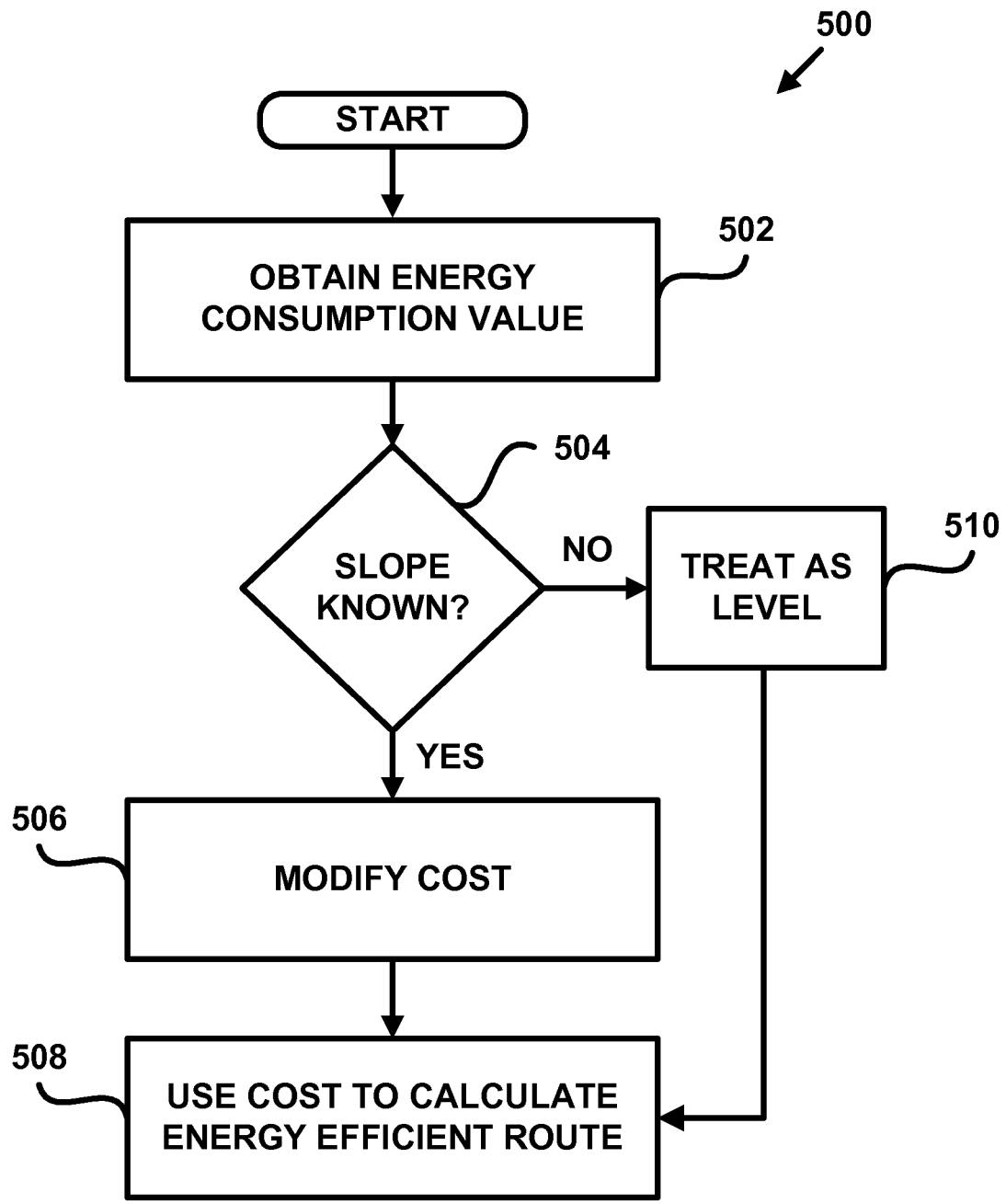
FIG. 5 is a flow chart of a method for calculating segment cost for use in energy efficient routing, according to an example.

FIG. 5 is a flow chart of a method 500 for calculating segment cost for energy efficient routing. The method 500 may be performed by any combination of hardware and software. For example, the processor 14 may execute the route calculation application 34 stored in memory 18. The method 500 dynamically calculates segment cost; however, it is understood that the segment cost may be calculated and stored as an attribute in the geographic database 26.

At block 502, the processor 14 obtains an energy consumption value for a road segment. The energy consumption value may be calculated based on physical modeling of the road segment and then stored in a lookup table or database, such as the geographic database 26. For example, the value may be calculated based on the altitude difference h of the segment, the associated speed limit, the segment characteristics, and other geographic data stored in the geographic database 26. Additionally or alternatively, the value may be obtained from energy consumption data collected as one or more vehicles travel on the road segment. Regardless of how the energy consumption value is obtained, the processor retrieves the value from the table or database.

At block 504, the processor 14 determines whether slope data is available for the segment by reading the data stored in the segment characteristic attribute 308 in the associated segment record 300. If slope data is available, at block 506 the processor 14 adjusts the value obtained at block 502, as necessary, by subtracting a bias amount. If the end of a segment has a higher elevation than the start of the segment, a positive bias term is subtracted from the value obtained at block 502. If the end of the segment has a lower elevation than the start of the segment, a negative bias term is subtracted from the value obtained at block 502.

At block 508, the route calculation application 34 uses the result of the calculation at block 506 to calculate an energy efficient route. If slope data is not available for a segment, at block 510, the road segment is assumed to be level. For a level road segment, the route calculation application 34 uses the energy consumption value obtained at block 502 to calculate an energy efficient route.

As a result of the method 500, the segment cost associated with a segment having a slope that can be traveled with typical efficiency is the same as the segment cost associated with a segment with zero slope or unknown slope. Additionally, the segment cost associated with a segment with slope that can be traveled in an efficient way (uphill or downhill) is less than the segment cost associated with a segment with unknown slope. Moreover, the segment cost associated with a segment with a slope that causes inefficient travel (uphill or downhill) is greater than the segment cost associated with a segment with unknown slope.

V. The Value of the Energy Factor

The value of the energy factor e can vary as long as a single fixed value of e is used throughout one route calculation. However, the use of the A* and Dijkstra routing algorithms may limit the range of acceptable values for the energy factor.

In one example, the value for e may be chosen so that $C_{segment}$ is positive for every road segment, which allows for the use of the A* or the Dijkstra routing algorithms. If e is too small (e.g., zero for an electric vehicle with regenerative braking), negative costs may arise for downhill roads (i.e., negative h). If e is too big, negative costs may arise for uphill roads (i.e., positive h).

In another example, the value of e may be chosen to maximize the minimum cost per distance, which optimizes the performance of the A* routing algorithm. The value of e may be also chosen to result in a reasonable lower bound of the cost per distance so that the A* routing algorithm is more efficient than the Dijkstra routing algorithm.

In another example, the energy factor e is the derivative of the energy consumption with respect to the altitude difference at a typical speed and zero slope, which balances the relative preferences of uphill and downhill roads with roads of unknown slope.

In another example, the energy factor e may be defined as follows:

$$e = m*g*\eta_{typical} \quad \text{(Equation 8)}$$

where m is vehicle mass, g is the Earth's gravity (9.81 m/s²), and $\eta_{typical}$ is a typical efficiency of an engine, which is based on the engine's properties. This value of the energy factor e may also balance the relative preferences of uphill and downhill roads with roads of unknown slope.

While the actual value of e does not affect route choice when all slopes are known, the energy factor has a clear effect with unknown slopes. The value of e affects the trade-off for uphill versus downhill. A high value for e increases the preference of uphill roads over roads with unknown slope and of roads with unknown slope over downhill roads, while a low value for e increases the preference of roads with unknown slope over uphill roads and of downhill roads over roads with unknown slope.

VI. Alternatives

As an alternative, it may be desirable to give roads with known slope a slight preference over roads with unknown slope. For example, a preference may be given to a level road over a road where it is unknown whether the road is flat or has slopes. This preference may be achieved by adding a penalty to the cost for roads with unknown slope. For example, the penalty for an unknown slope may be the additional cost associated with traveling on a road segment with a slight uphill slope.

As another alternative, the bias term may depend on absolute altitudes of the start altitude and the end altitude. In this alternative, the bias term is $f(h_2)-f(h_1)$, where f is a monotonically increasing function, $h_2$ is an altitude of an end of the road segment, and $h_1$ is an altitude of a start of the road segment.

When all segments have known slope values, the bias term may be generalized to $f(v_2)-f(v_1)$, where $v_1$ and $v_2$ are the start and end nodes for the segment, and f maps the nodes to real numbers. In this example, f is chosen such that after applying the bias term, all segment costs are nonnegative. The first stage of Johnson's algorithm may be used to determine f. Johnson's algorithm finds the shortest paths between all pairs of vertices in a sparse directed graph. Johnson's algorithm allows some of the edge weights to be negative numbers, but no negative-weight cycles may exist.

Another alternative is calculating a route that minimizes not just energy consumption, but a combination of energy and other criteria. The other criteria may include time, distance, tolls, number of turns, and so on. In this case, in the segment cost, the term representing the energy can be modified as described above to avoid the same problems and to gain the same advantages as described above for an energy-minimizing route.

While the previous description adjusts costs based on potential energy, a similar adjustment may be made based on kinetic energy. In this alternative, the energy consumption for a segment includes the energy needed to accelerate the vehicle from the speed at the start of a segment to the speed at the end of the segment or the energy gained by decelerating the vehicle from the speed at the start of the segment to the speed at the end of the segment. In this embodiment, the bias term is an energy factor multiplied by the difference in speed squared (i.e., $e(v_2^2-v_1^2)$, where $v_1$ is the starting speed and $v_2$ is the ending speed). As a result, the navigation system 10 may provide the driver with an energy efficient route taking variations in speed into account.

VII. Conclusion

As a result of using the bias term when calculating a segment cost, previous problems encountered with energy efficient routing calculations may be reduced or eliminated. The bias term prevents a road segment with no slope data from being favored over a road segment that has a positive slope. Similarly, the bias term prevents a road segment with a negative slope from being favored over a road segment that has no slope data. Moreover, the bias term allows common routing algorithms, such as A* and Dijkstra, to be used in calculating energy efficient routes for electric and hybrid vehicles.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    receiving data indicative of a destination and an origin; and
    displaying, by a navigation system, an energy efficient route from the origin to the destination,
    wherein the energy efficient route is generated using a plurality of road segment costs for a plurality of road segments; and
    wherein one or more road segments of the plurality of road segments has an unknown slope;
    wherein the plurality of road segment costs are calculated by subtracting a bias amount from an energy consumption value of a road segment, wherein the bias amount is equal to the road segment's altitude difference multiplied by an energy factor; wherein the segment cost of the one or more road segments with the unknown slope is equal to the energy consumption value of the one or more road segments.

2. The method of claim 1, wherein the energy factor is based on potential energy stored in a vehicle modeled as traveling the road segment.

3. The method of claim 2, wherein the energy factor is based on a mass of the vehicle.

4. The method of claim 1, wherein the segment cost includes an energy consumption component based on an elevation change for the road segment.

5. The method of claim 1, wherein the energy factor is associated with energy gained by a hybrid vehicle when traveling downhill.

6. The method of claim 1, wherein the energy factor is based on an efficiency of an engine of a vehicle.

7. A method comprising:
    accessing a segment cost for a road segment of a plurality of road segments, wherein at least one road segment of the plurality of road has an unknown slope;
    performing a comparison of a first elevation of a start of the road segment to a second elevation of an end of the road segment;
    calculating a bias amount equal to an absolute value of the road segment's altitude difference multiplied by an energy factor;
    determining whether the road segment is an uphill segment or a downhill segment based on the comparison of the first elevation to the second elevation;
    subtracting, with a processor, the bias amount from the segment cost when the road segment is the uphill segment;
    adding, with the processor, the bias amount to the segment cost when the road segment is the downhill segment; and
    calculating, by a navigation system, an energy efficient route for a hybrid vehicle based on the energy factor and one or more segment costs for one or more road segments of the plurality of road segments;
    displaying, by the navigation system, the energy efficient route.

8. The method of claim 7, wherein the energy factor is based on potential energy stored in a vehicle modeled as traveling the road segment.

9. The method of claim 8, wherein the energy factor is based on a mass of the vehicle.

10. The method of claim 7, wherein the segment cost includes an energy consumption component based on an elevation change for the road segment.

11. The method of claim 7, further comprising:
    determining whether the segment cost for the road segment includes an energy consumption component based on the elevation change for the road segment; and
    identifying the energy factor in response to the segment cost of the road segment including the energy consumption component.

12. The method of claim 7, wherein the energy factor is associated with energy gained by the hybrid vehicle when traveling downhill.

13. A navigation system comprising:
    a user interface configured to receive data indicative of a destination and an origin; and
    a map display configured to display an energy efficient route from the origin to the destination, wherein the energy efficient route is determined based on a segment cost for at least one road segment of a plurality of road segments, wherein one or more road segments of the plurality of road segments has an unknown slope; wherein the segment cost is calculated by subtracting a bias amount from an energy consumption value of the road segment, wherein the bias amount is equal to the road segment's altitude difference multiplied by an energy factor; wherein the segment cost of the one or more road segments with the unknown slope is equal to the energy consumption value of the one or more road segments.

14. The navigation system of claim 13, wherein the road segment is identified as an uphill segment or a downhill segment based on a comparison of a first elevation of a start of the road segment to a second elevation of an end of the road segment.

15. The navigation system of claim 13, wherein the energy consumption value includes a component based on an elevation change for the road segment.

16. The navigation system of claim 13, wherein the energy factor is associated with energy gained by a hybrid vehicle when traveling downhill.

17. The navigation system of claim 13, wherein the energy efficient route is associated with a hybrid vehicle or an electric vehicle configured for regenerative braking.

18. The navigation system of claim 13, wherein the selected route includes at least one segment of unknown slope.

* * * * *